Sept. 10, 1940.  J. K. NAGAMATSU  2,214,063
WEED CUTTER
Filed June 9, 1939

INVENTOR.
James K. Nagamatsu
BY
ATTORNEY.

Patented Sept. 10, 1940

2,214,063

UNITED STATES PATENT OFFICE 2,214,063

WEED CUTTER

James K. Nagamatsu, Santa Ana, Calif.

Application June 9, 1939, Serial No. 278,197

2 Claims. (Cl. 97—43)

My invention relates to improvements in weed cutters of that type employing a rotary cutting blade which is adapted to destroy weed growth. The primary object of the invention is to destroy weed growth after planting seed in the ground and before or after the seed starts to sprout but before the growth emerges above the surface of the soil to any considerable extent, so as to eliminate all or to a considerable degree hoeing expense formerly done by manual labor. By the use of my invention the weed growth is cut above and without injuring the seed sprouts and the soil is simultaneously broken and loosened in such manner as to avoid the necessity of hand hoeing which heretofore has been necessary and customary. More uniform work is performed by the use of my invention than by hand hoeing. Also by the use of my improvement injury to the seed which has been planted and which has sprouted is avoided. Further much time and expense are saved by the use of my invention. Among further objects is the production of a simple, light, strong, inexpensive and effective structure of the type stated.

Figure 1:
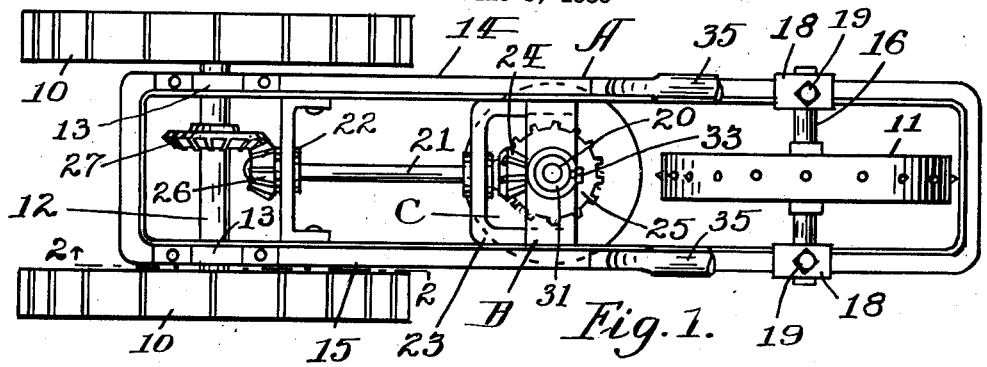
Figure 2:
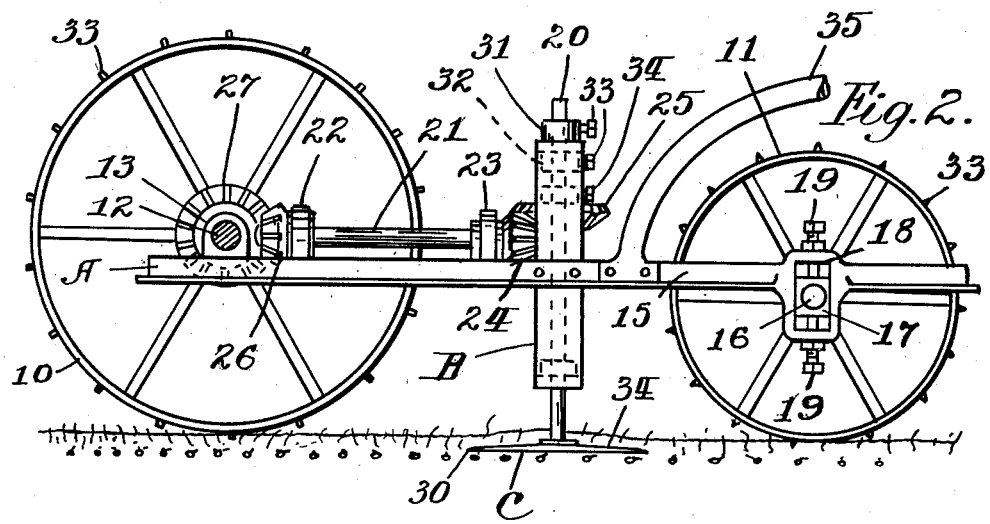
Figure 3:
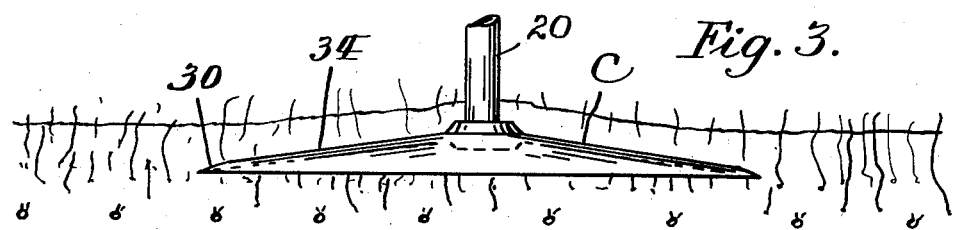
Figure 4:
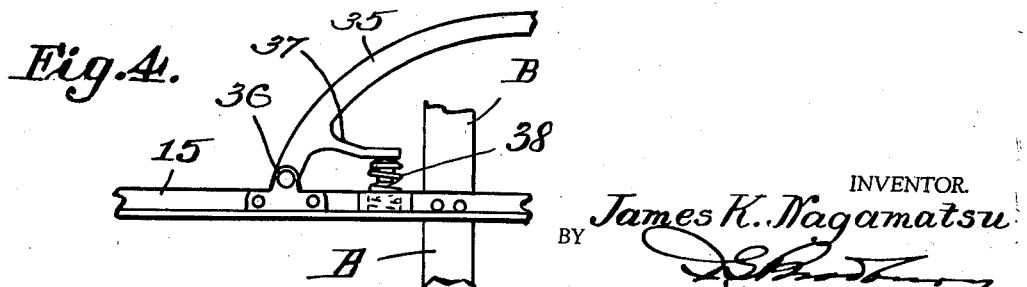

In the accompanying drawing forming part of this specification, Fig. 1 is a plan of my improved weed cutter; Fig. 2 is a side elevation of the structure shown in Fig. 1, a portion being shown in section taken on line 2—2 of Fig. 1; Fig. 3 is an enlarged side elevation of a detail illustrating the cutting blade in the act of cutting weed growth in the ground after the seed has been planted and has started to sprout, and Fig. 4 is a side elevation of a detail showing an alternative construction of part of my improvement.

In the drawing, A is a horizontal oblong skeleton body frame. The rearward end of this frame is supported by a pair of carrier wheels 10 and the forward end is supported by the single carrier wheel 11. The carrier wheels 10 are mounted upon the ends of a transverse shaft 12 which are journaled in the bearings 13. These bearings are mounted upon the opposite side members 14 and 15 of the body frame. The forward carrier wheel 11 is mounted upon the shaft 16, the ends of which are journaled in the bearing blocks 17, said blocks in turn being held in vertical guides 18 between the ends of adjusting bolts 19 so that the forward end of the body frame can be adjusted in elevation on the carrier wheel for purposes to be hereinafter described.

B is a vertical yoke secured rigidly to the side members 14 and 15 in the median portion of the body frame. Passing vertically through this yoke and journaled therein substantially midway between the side members of the body frame is a revoluble shaft 20. This shaft projects downwardly below the body frame and carries on its lower end the rigidly mounted weed cutting disc C which is adapted to cut and destroy the weed growth in the soil over which the carrier frame is caused to travel. The cutting disc and its shaft are revolved by a suitable motion transmitting connection with the drive shaft 12. As shown this connection comprises a longitudinal shaft 21, the ends of which are journaled in the transverse bearing supports 22 and 23 between the side members of the body frame, the pair of intermeshing miter gears 24 and 25 between the forward end of shaft 21 and the vertical disc shaft 20, and the pair of miter gears 26 and 27 between the rearward end of shaft 21 and the transverse drive shaft 12. Thus as the carrier frame advances the revolution of the carrier wheels 10 causes the cutting disc C to revolve at the desired speed to efficiently cut weed growth with which the cutting edge 30 of the blade contacts. The peripherial speed at which the cutting disc revolves is preferably relatively greater than the forward speed of the machine so as to cut the weed growth most effectively. While I have shown a gear connection between the vertical shaft 20 and the driven shaft 12 for rotating the cutting disc the invention contemplates any suitable means for revolving the cutting disc. The rotary cutting disc C is held at the desired elevation relative to the body frame by the pair of bearing collars 31 and 32 on opposite sides of the upper end of the yoke B, said collars being releasably secured to the disc shaft by set screws 33. In practice the cutting disc is adjusted to cut the weed growth close to or slightly below the surface of the soil but above seeds which have been planted so as not to disturb or cut any sprouts of the latter. When the disc shaft is adjusted in elevation as desired the miter gear 25 is secured to said shaft by the set bolt 34 with its teeth in proper mesh with the teeth of the companion gear 24.

The cutting disc C consists of a thin circular plate which revolves in a horizontal plane or while slightly inclined forwardly. This plate resembles a cone, being cupped slightly upwardly towards its center and is concentrically mounted upon its drive shaft 20. Its upper surface slopes slightly upwardly and inwardly in an inclined plane which serves to break the soil and loosen it without disturbing the seed and young growth below. The upper surface adjoining the periphery of this disc is sharpened to a smooth knife edge 30 so as to readily cut the weed growth by centrifugal cutting action. The abrasive action of the soil on the upper surface and adjoining the periphery of the disc automatically maintains the cutting edge sharp which is an advantage. The cupping of the disc upwardly and inwardly also causes its upwardly sloping surface 34 to lift and loosen the soil above the disc as the machine advances thus cultivating the soil above the seed which has been planted and promoting growth. By adjusting the elevation of the front end of the body frame on the carrier wheel 11 by the adjusting bolts 19 a slight forwardly declining pitch may be imparted to the cutting disc so that it will bite into and tend to remain imbedded at the desired depth in the soil. However this inclination may not be sufficient to hold the blade at the proper depth as the machine advances and I provide upwardly and longitudinally projecting arms 35 on the frame by which the vehicle is propelled and by which part of the propelling effort is diverted downwardly upon the frame to hold the rotary cutting blade at relatively even elevation irrespective of the condition of the soil. These propelling arms 35, when extending forwardly as shown may be attached to a tractor or other vehicle for operation or when extended backwardly (not shown) may be used to push the machine by hand or power. This feature is important because when the machine is light in weight as in the present instance the cutting blade must be held at even elevation in the ground or it will not operate evenly. Calks 33 of any suitable well known construction may be used on the rims of the carrier wheels to improve traction and break the soil in case it is hard or incrusted.

In the alternative construction a propelling arm 35 is hinged at 36 on each side bar of the body frame and a lever arm 37 integral with the arm 35 presses downwardly against a spring 38 whereby the forward end of the body frame is held downwardly under spring action and the disc cutter is maintained at even depth in the soil while the machine is advanced by said propelling arm or arms.

In practice the body frame is coupled to a vehicle to be drawn or propelled by the arms 35 and as the machine advances the cutting blade cuts the weed growth above the seeds planted in the soil and simultaneously breaks and cultivates the soil above the seed so as to promote growth of the seed. The structure is exceedingly simple and effective in operation and is adapted to save much hand labor and expense. It performs the function of cutting and destroying weeds and cultivating the soil above freshly planted seed growth very effectively and by its uniform operation reduces loss of young stock which usually results from uneven hand hoeing. I have found it particularly useful and beneficial in the growth of peppers, onions, carrots and cotton but it is equally applicable for use with many other growths. These various growths at different depths are compensated by adjusting the cutting disc to operate at the most advantageous depth and elevation above the planted seed.

Various other modifications of the parts of my invention to produce the results attained are contemplated within the sprit of my invention and within the scope of the following claims.

I claim:

1. In a weed cutting machine, the combination of a body frame, supporting wheels disposed below the forward and rearward ends of said frame, a vertical shaft extending downwardly and journaled upon said frame, a substantially horizontal rotary cutting disc carried by the lower end of said shaft and adapted to travel below the surface of the soil and cut the weed growth as the machine advances, means for revolving said vertical shaft to impart centrifugal action to said disc, and a propelling member hinged to said frame having a laterally extending presser arm and a spring upon the body frame against which the presser arm is impressed by the swinging movement of the hinged member to hold the body frame down and the disc evenly imbedded in the ground as the machine advances.

2. In a weed cutting machine, the combination of a body frame, supporting wheels disposed below the forward and rearward ends of said frame, a vertical shaft extending downwardly and journaled upon said frame, a conical rotary cutting disc carried by the lower end of said shaft and adapted to travel below the surface of the soil and cut the weed growth as the machine advances, means for revolving said vertical shaft to impart centrifugal action to said disc, and a propelling member movably connected to swing upon said frame in a vertical plane and resiliently impressed downwardly by the swinging movement thereof, whereby the body frame is held down and the disc is evenly imbedded in the ground as the machine advances.

JAMES K. NAGAMATSU.